June 28, 1938.  E. EGER  2,121,956

NONSKID TIRE

Filed July 14, 1936

INVENTOR.
ERNST EGER
BY
ATTORNEY.

Patented June 28, 1938

2,121,956

UNITED STATES PATENT OFFICE 2,121,956

NONSKID TIRE

Ernst Eger, Grosse Pointe Park, Mich., assignor to United States Rubber Products, Inc., New York, N. Y., a corporation of Delaware Application July 14, 1936, Serial No. 90,511

3 Claims. (Cl. 152—211)

This invention relates to pneumatic tires, and in particular it relates to tires having incorporated within the tread portion thereof metallic inserts for the purpose of engaging with a road surface and increasing the antiskid quality of the tires.

In general, the invention consists of a pneumatic tire having a tread portion including a plurality of individual traction elements, and having embedded in at least some of the traction elements a cup-shaped metallic member positioned in such manner that its rim portion is flush with the surface of the tread elements, the cup shaped member having an opening in its base portion whereby some of the tread rubber may extend through the opening and into the cup shaped member.

It has been demonstrated that, on hard, packed snow or ice all conventional tires having all rubber treads function in substantially the same manner, regardless of the design or tread configuration of the tire. Due to such road conditions it is necessary to incorporate materials, preferably metallic, within the tread rubber of certain tires in order to increase the non-skid quality of the tires in operation. To attain the greatest degree of efficiency for metal inserts in a tire tread it is essential that such inserts do not limit the movement of the tread rubber due to displacement of the rubber under load. Furthermore, the inserts must be relatively light in weight, and should be of such shape that they will be distributed over a substantial area of the road contacting portion of the tread.

An object of the present invention is to so dispose rigid metal inserts in the rubber in the tire tread that the rubber will not be confined in or between rigid inserts. In other words, the rubber may adjust itself so as to permit the rim of a cup shaped metal insert to engage with the road surface.

Another object of the invention is to provide inserts capable of being readily and economically positioned in a tire mold and transferred to and embedded in a tire during the vulcanizing operation.

These and other objects and advantages appear more fully in the following detailed description, when considered in connection with the accompanying drawing, in which.

Figure 1:
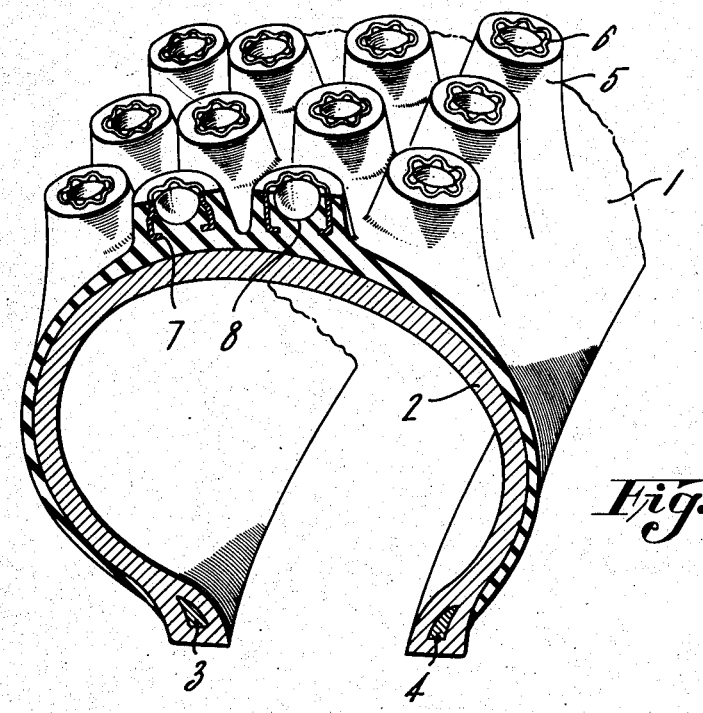
Fig. 1 is a perspective view, in section, of a portion of a pneumatic tire illustrating an embodiment of the invention.

My invention is particularly applicable to pneumatic tires of the heavy service type. Therefore, in Fig. 1, I show a heavy service pneumatic tire 1 having a carcass 2 and inextensible bead elements 3 and 4.

The wearing portion of the tread comprises a plurality of antiskid elements 5 in the form of cylindrical projections or buttresses. Embedded within each, or at least some of the antiskid elements 5 is a cup-shaped insert 6 composed of any rigid material, and is preferably of metal. The inserts 6 are embedded in the rubber of each, or at least some, of the antiskid elements 5 in such manner that the rim portions of the cups are flush with the road contacting surface of the tread.

Varying degrees of non-skid effectiveness may be obtained by embedding the inserts in certain of the antiskid elements. For example, the inserts may be incorporated in the outer rows only of the antiskid elements; or, they may be embedded in the central rows of the antiskid elements; or, further, the inserts may be assembled in certain rows of the antiskid projections and in certain buttons in such rows.

In order to attain the best advantages of the present invention it is essential that the antiskid elements 5 constitute independent projections or buttresses, as opposed to continuous, circumferential ribs, in order to prevent the rubber of the tread from being confined between adjacent inserts 6. If the rubber is not permitted to move readily when under load and in contact with a road surface, there is a tendency for the rubber alone to support the load and prevent the metal insert from engaging directly with the road surface. On icy or slippery surfaces it is highly desirable for the cup shaped metal inserts 6 to engage directly with the supporting surface. This condition is only permissible when the rubber is free to adjust itself in a manner permitting the insert to be exposed at the surface of the tread.

Figure 2:
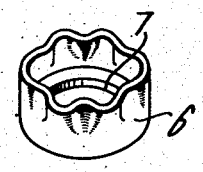
Fig. 2 is a perspective view of a non-skid insert.

Also for the purposes of assembly, as described hereinafter, I prefer that the metallic inserts 6 be in the form of cups (Fig. 2), each having an opening 7 at the base thereof, or being tubular in form, having a flange extending inwardly from one end.

As previously stated, the maximum efficiency of a non-skid tire can only be obtained when the rubber is free from confinement between the surfaces of the insert. Therefore, I provide a depression or cavity 8 in the rubber and within each insert 6. The rubber within the insert 6 is bonded to the inner surface of the insert, and merges with the underlying portion of the tread rubber through the opening 7 at the base of the insert 6.

In order to obtain a proper bond between the insert and the tread rubber, it is preferable to treat the insert prior to its assembly with the tire to increase its adhesion characteristic with the rubber. This may be accomplished in various ways. For example, if the insert is in the form of a steel stamping, it may be bronze plated and coated with a layer of rubber cement.

Figure 3:
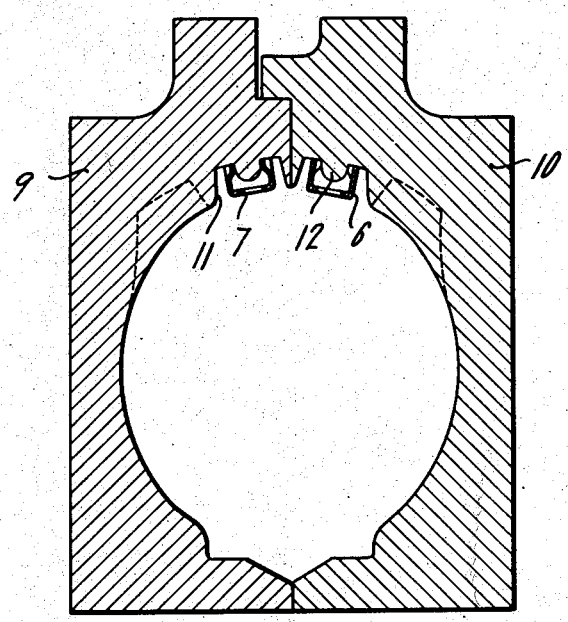
Fig. 3 is a transverse view, in section, of a tire mold, illustrating a method of assembling inserts.

Fig. 3 illustrates a method of assembling the metallic inserts 6 in a mold within which a tire of my embodiment is subsequently vulcanized. The mold comprises mold sections 9 and 10 having a conventional tread configuration 11 such as individual projections or buttons. At each button or tread element into which the insert is embedded, a projection 12 in the mold section results in a formation of the cavity 8 in the finished tire. This projection 12 has an additional function to perform in that it operates as a securing means to which an insert 6 is attached in the mold. To permit the surfaces of the inserts 6 to cling to the projections 12 the edges of the inserts have an undulated or wavy outline, so that when the inserts are pressed into engagement with the projections 12 a light press fit results, which operates to retain the inserts firmly within the mold depressions forming the antiskid elements of the tire. The undulated edge of the insert provides only a few contacting points with the mold projections 12, thus being more adapted to form a tight, yet removable, engagement with the projections 12. In addition it permits the rubber to flow to the interior of the insert and in part to the rim surface thereof.

In assembling a tire of my invention, an operator procures a number of inserts which have been previously treated to increase their bonding efficiency. These inserts are manually positioned over the mold projections 12, and the operator forces them over these projections so that they will be self-retained thereon. When the desired number and arrangement of inserts are assembled in the mold, a raw tire of conventional form is inserted in the mold, and the tire is subjected to vulcanization. During the curing process the rubber flows into the antiskid projections in the mold, and also through the openings 7 in the inserts and into the cups formed thereby.

When vulcanization is complete the tire is removed from the mold in any conventional manner. The adhesion of the rubber to the inserts is sufficient to cause the inserts to withdraw from the projections 12 when the tire is removed from the mold.

When a tire incorporating the embodiments of my invention is in operation, that portion of each insert 6 which is exposed at the road engaging surface of the tread wears down quickly until the exposed portion of the insert extends below the tread surface. Thereafter the rate of wear of the inserts is substantially the same as the rate of wear of the tread rubber. An advantage of this wearing condition is that the metal inserts do not contact with the road surface upon the initial engagement of the tread with the road. As a result there is no initial impact of the metal inserts with the road, and therefore there is no objectionable noise produced. The metal inserts contact with the road surface only at that portion of the tire which is under direct load.

While I have shown and described a certain present preferred embodiment of my invention, it will be understood that modifications may be made without departing from the spirit of the invention and the scope of the appended claims.

Having thus described my invention, what I claim and desire to protect by Letters Patent is:—

1. A pneumatic tire having permanently attached traction elements at least some of which comprise a cup-shaped metallic member presenting a cutting edge to a road surface, an external rubber composition covering for said member bonded thereto, said covering being externally unconfined near said cutting edge to permit the rubber composition adjacent to said edge to move relatively thereto, and a body of bonded rubber composition disposed internally thereof and incompletely filling the member and forming a thin internally unconfined covering for the interior of said cutting edge, whereby the rubber composition adjacent to said edge may be distended away from said cutting edge to permit the edge to have a cutting engagement with a road surface.

2. In a pneumatic tire, a tread of rubber composition having a plurality of individual antiskid units bonded in the tread composition, each unit comprising a cup-shaped metallic member presenting a cutting edge to a road surface, the tread composition being externally unconfined near each cutting edge to permit the rubber composition adjacent to said edge to move relatively thereto, and a portion of the tread composition disposed internally of and incompletely filling the member and forming a thin internally unconfined covering for the interior of said cutting edge, whereby the rubber composition adjacent to said edges may be distorted away from said cutting edges to permit the edge to have a cutting engagement with a road surface.

3. A pneumatic tire comprising a rubber tread and metallic cup-shaped elements each having an exposed cutting edge embedded in and bonded to said tread, the tread rubber covering extending through an opening in each element and internally thereof and terminating in a thin externally unsupported edge adjacent to said cutting edge, but not completely filling the element, and forming a thin external unsupported edge adjacent to said cutting edge, whereby the rubber adjacent to said cutting edges may be distorted to permit the cutting edges to directly exert a cutting action on a road surface.

ERNST EGER.